United States Patent
Mensa-Wilmot et al.

[11] Patent Number: 6,148,937
[45] Date of Patent: Nov. 21, 2000

[54] PDC CUTTER ELEMENT HAVING IMPROVED SUBSTRATE CONFIGURATION

[75] Inventors: Graham Mensa-Wilmot; Carl W. Keith, both of Houston, Tex.

[73] Assignee: Smith International, Inc., Houston, Tex.

[21] Appl. No.: 08/906,886

[22] Filed: Aug. 6, 1997

Related U.S. Application Data

[63] Continuation-in-part of application No. 08/663,516, Jun. 13, 1996, and application No. 08/701,855, Sep. 4, 1996
[60] Provisional application No. 60/024,610, Aug. 26, 1996.

[51] Int. Cl.⁷ .................................................. F21B 10/46
[52] U.S. Cl. .......................... 175/428; 76/108.2; 175/432
[58] Field of Search ..................... 175/428, 432; 76/108.2; 407/118; 51/295

[56] References Cited

U.S. PATENT DOCUMENTS

| | | | |
|---|---|---|---|
| 4,109,737 | 8/1978 | Bovenkerk | 175/329 |
| 4,629,373 | 12/1986 | Hall | 407/118 |
| 4,716,975 | 1/1988 | Dennis | 175/329 |
| 4,784,023 | 11/1988 | Dennis | 76/108 |
| 4,954,139 | 9/1990 | Cerutti | 51/293 |
| 4,972,637 | 11/1990 | Dyer | 51/295 |
| 4,984,642 | 1/1991 | Renard et al. | 175/329 |
| 4,997,049 | 3/1991 | Tank et al. | 175/410 |
| 5,007,207 | 4/1991 | Phaal | 51/204 |
| 5,011,515 | 4/1991 | Frushour | 51/307 |
| 5,037,451 | 8/1991 | Burnand et al. | 51/293 |
| 5,120,327 | 6/1992 | Dennis | 51/293 |
| 5,217,081 | 6/1993 | Waldenström et al. | 175/420.2 |
| 5,351,772 | 10/1994 | Smith | 175/428 |
| 5,355,969 | 10/1994 | Hardy et al. | 175/432 |
| 5,379,854 | 1/1995 | Dennis | 175/434 |
| 5,435,403 | 7/1995 | Tibbitts | 175/432 |
| 5,469,927 | 11/1995 | Griffin | 175/432 |
| 5,472,376 | 12/1995 | Olmstead et al. | 451/540 |
| 5,477,034 | 12/1995 | Dennis | 219/615 |
| 5,484,330 | 1/1996 | Flood et al. | 451/540 |
| 5,484,468 | 1/1996 | Östlund et al. | 75/236 |
| 5,590,728 | 1/1997 | Matthias et al. | 175/432 |
| 5,598,750 | 2/1997 | Griffin et al. | 76/108 |
| 5,617,928 | 4/1997 | Matthias et al. | 175/432 |
| 5,622,233 | 4/1997 | Griffin | 175/432 |
| 5,711,702 | 1/1998 | Devin | 451/540 |

FOREIGN PATENT DOCUMENTS

| | | |
|---|---|---|
| 0322214 | 12/1988 | European Pat. Off. . |
| 0462955 | 6/1991 | European Pat. Off. . |
| 0691167 | 1/1996 | European Pat. Off. . |
| 2275068 | 8/1994 | United Kingdom . |
| 2290328 | 12/1995 | United Kingdom . |

*Primary Examiner*—William Neuder
*Attorney, Agent, or Firm*—Conley, Rose & Tayon, P.C.

[57] ABSTRACT

A supporting substrate for supporting a diamond layer on a cutting element is disclosed which has an irregular surface defining the interface between the substrate and the diamond layer. The irregularities in the surface may have varying amplitudes, varying frequencies, or both and can vary according to defined mathematical expressions. The irregularities may assume recognizable geometric forms, such as spiral, circle or wave configurations, or may be arranged in an irregular manner. The surface is constructed with or without a plane of symmetry and may have different average amplitudes and/or frequencies in different areas.

36 Claims, 7 Drawing Sheets

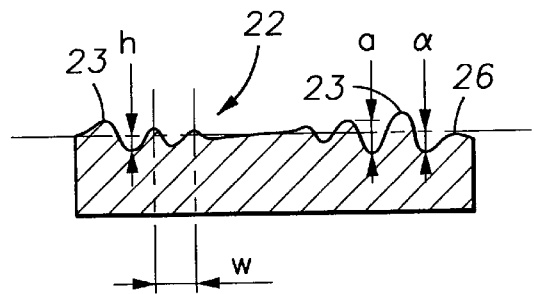
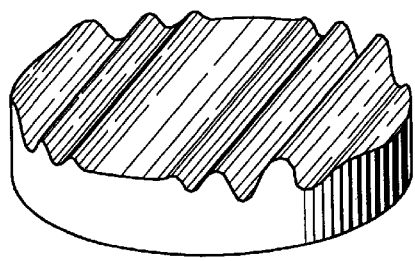
FIG. 2A  FIG. 2B
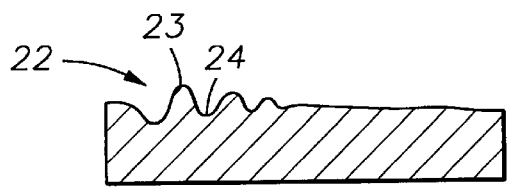
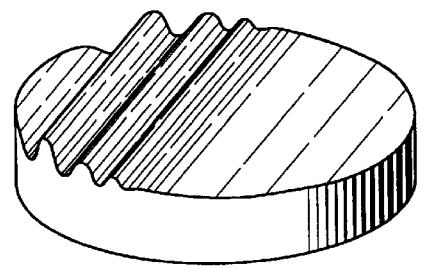
FIG. 3A  FIG. 3B
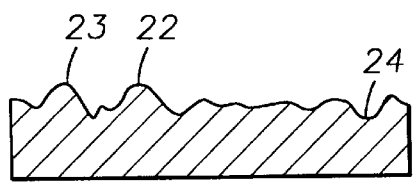
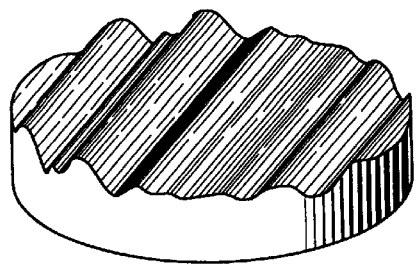
FIG. 4A  FIG. 4B

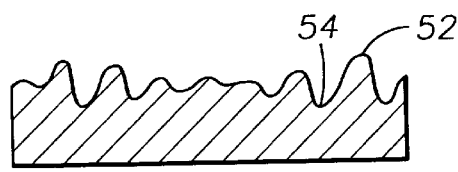
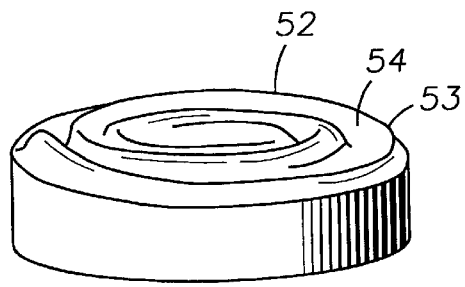
FIG. 5A            FIG. 5B
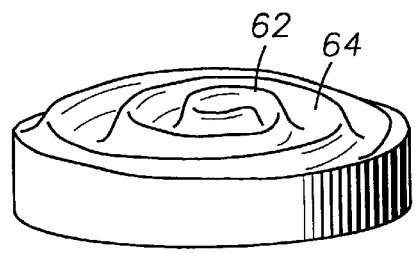
FIG. 6A            FIG. 6B
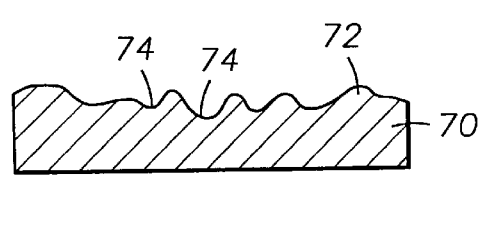
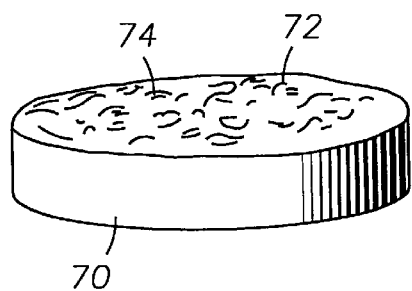
FIG. 7A            FIG. 7B

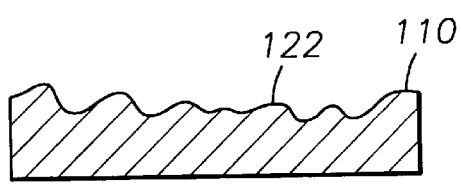
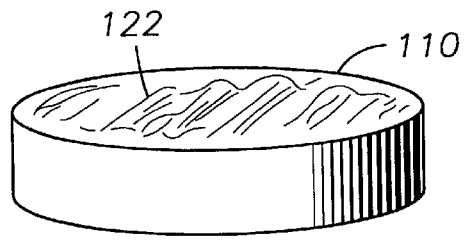
*FIG. 11A*  *FIG. 11B*
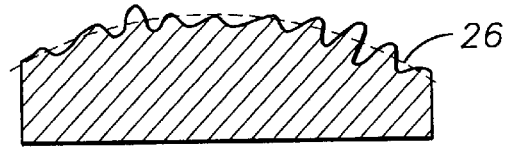
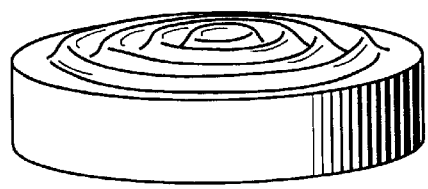
*FIG. 12A*  *FIG. 12B*
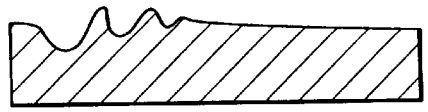
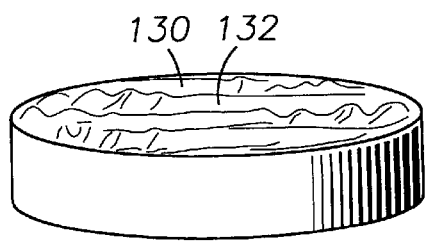
*FIG. 13A*  *FIG. 13B*

PDC CUTTER ELEMENT HAVING IMPROVED SUBSTRATE CONFIGURATION

RELATED APPLICATIONS

This application is a continuation-in-part of applications Ser. No. 08/663,516, filed Jun. 13, 1996, Ser. No. 60/024,610, filed Aug. 26, 1996, and Ser. No. 08/701,855, filed Sep. 4, 1996; all of which are incorporated herein in their entireties.

TECHNICAL FIELD OF THE INVENTION

The present invention relates generally to cutting elements for use in earth-boring drill bits and, more specifically, to a means for increasing the life of cutting elements that comprise a layer of superhard material, such as diamond, affixed to a substrate. Still more particularly, the present invention relates to a polycrystalline diamond compact comprising a supporting substrate and a diamond layer supported thereon, wherein the supporting substrate includes a plurality of projections having defined frequencies, amplitudes and/or configurations.

In a typical drilling operation, a drill bit is rotated while being advanced into a soil or rock formation. The formation is cut by cutting elements on the drill bit, and these cuttings are flushed from the borehole by the circulation of drilling fluid toward the top of the borehole. The drilling fluid is delivered to the drill bit through a passage in the drill stem and is ejected outwardly through nozzles in the cutting face of the drill bit. The ejected drilling fluid is directed outwardly through the nozzles at high speed to aid in cutting, and to flush the cuttings and cool the cutter elements.

Conventional cutting elements typically comprise a stud or cylinder having a supporting surface at one end, and a cutting disk mounted on the supporting surface. The disk comprises a substrate having one surface bonded to the supporting surface and a second surface that carries a diamond substance such as a layer of polycrystalline diamond or thermally stable diamond. The stud and substrate are normally formed of a hard material such as tungsten carbide (WC). Alternatively, the diamond layer can be directly applied to the carbide stud or cylinder. The techniques for constructing polycrystalline diamond (PDC) cutting elements are generally well known will not be described in detail. They can be summarized as follows: a carbide substrate is formed having a desired surface configuration on each of its first and second surfaces; the substrate is placed in a mold with a superhard material, such as diamond powder, and subjected to high temperature, high pressure pressing, resulting in the formation of a diamond layer bonded to the substrate surface; and the substrate is braze-bonded to the stud or cylinder. At present, the interface between the superhard cutting layer and the substrate is typically planar, although some non-planar diamond/substrate interfaces have been disclosed.

As used herein, the term "superhard" means a material having a hardness of at least 2,700 Knoop (kg/mm2). PCD grades typically have a hardness range of about 5,000–8,000 Knoop (kg/mm2) while PCBN grades typically have hardnesses that fall within the range of about 2,700–3,500 Knoop (kg/mm2). By way of comparison, the hardest commonly used grade of cemented tungsten carbide has a hardness of about 1475 Knoop (kg/mm2).

Although cutting elements having this configuration have significantly expanded the scope of formations for which drilling with diamond bits is economically viable, the interface between the substrate and the diamond layer continues to be a limiting factor, as it is prone to failure, resulting in delamination, spalling and/or chipping of the diamond layer. There are several possible explanations for the failure of this interface. One explanation is that the interface between the diamond and the substrate is subject to high residual stresses resulting from the manufacturing processes of the cutting element. Specifically, because manufacturing occurs at elevated temperatures and pressures, the different properties of the diamond and substrate material, including their differing coefficients of thermal expansion result in thermally-induced stresses. In addition, finite element analysis (FEA) has demonstrated that during cutting high stresses are localized in both the outer diamond layer and at the tungsten carbide interface. Finally, the cutting elements are subjected to extremes of temperature and heavy loads when the drill bit is in use. It has been found that during drilling, shock waves may rebound from the internal planar interface between the two layers and interact destructively. All of these phenomena are deleterious to the life of the cutting element during drilling operations, as the stresses, when augmented by stresses attributable to the loading of the cutting element by the formation, may cause spalling, fracture and even delamination of the diamond layer from the substrate. In addition to the foregoing, state of the art cutting elements often lack sufficient diamond volume to cut highly abrasive formations, as the thickness of the diamond layer is limited by the resulting high residual stresses and the difficulty of bonding a relatively thick diamond layer to a planar substrate.

Hence, it is desired to provide a new and improved preform cutting element that overcomes or reduces the spalling and delamination problems referred to above.

SUMMARY OF THE INVENTION

The present invention provides a supporting substrate for a PDC compact wherein the substrate is provided with an irregular or asymmetric amplitude and/or frequency modulated surface to which the abrasive layer is affixed. The substrate surface may comprise various irregular features, including but not limited to irregular undulations, rings, spirals, or protrusions having various other shapes and/or combinations of shapes. The surface features may vary in height (amplitude), displacement (wavelength) or both. In one embodiment, the amplitude and/or wavelength vary according to defined mathematical equations.

One embodiment of the present invention comprises an asymmetrical substrate surface in which irregular undulations increase in height and/or displacement adjacent one side of the surface and decrease in height and/or spacing adjacent the opposite side of the surface. This produces a dual purpose substrate, whose orientation can be adjusted to maximize performance.

Another embodiment of the present invention comprises a substrate having a substantially planar interface from which a plurality of protuberances extend into the diamond table. The preferred protuberances decrease in amplitude toward the center of the interface and this decrease according to a prescribed mathematical relationship.

BRIEF DESCRIPTION OF THE DRAWINGS

For an introduction to the detailed description of the preferred embodiments of the invention, reference will now be made to the accompanying drawings, wherein:

FIGS. 2A and 2B are cross-sectional and perspective views, respectively, of a first embodiment of the present substrate layer;

FIGS. 3A and 3B are cross-sectional and perspective views, respectively, of a second embodiment of the present substrate layer;

FIGS. 4A and 4B are cross-sectional and perspective views, respectively, of a third embodiment of the present substrate layer;

FIGS. 5A and 5B are cross-sectional and perspective views, respectively, of a fourth embodiment of the present substrate layer;

FIGS. 6A and 6B are cross-sectional and perspective views, respectively, of a fifth embodiment of the present substrate layer;

FIGS. 7A and 7B are cross-sectional and perspective views, respectively, of a sixth embodiment of the present substrate layer;

FIGS. 11A and 11B are cross-sectional and perspective views, respectively, of a seventh embodiment of the present substrate layer;

FIGS. 12A and 12B are cross-sectional and perspective views, respectively, of an eighth embodiment of the present substrate layer;

FIGS. 13A and 13B are cross-sectional and perspective views, respectively, of a ninth embodiment of the present substrate layer;

DETAILED DESCRIPTION OF THE INVENTION

Figure 1A:
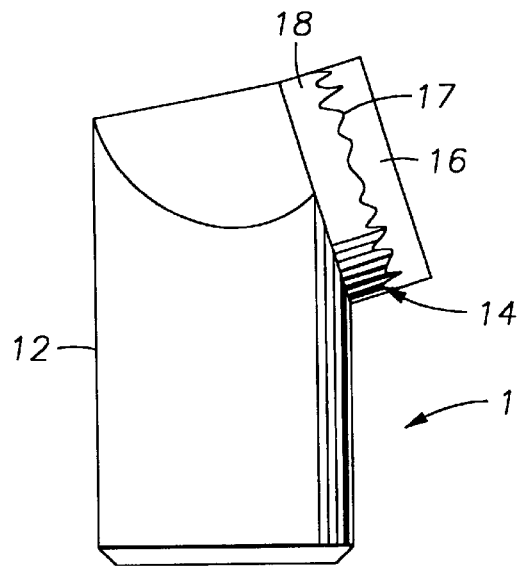
FIG. 1 is a side elevation of a cutting element according to the present invention.
Figure 1B:
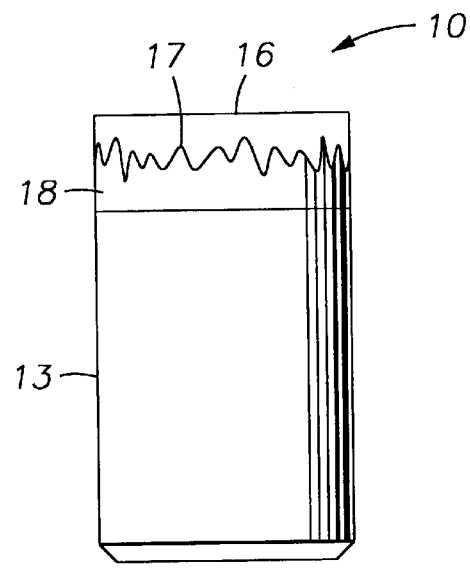
Figure 1C:
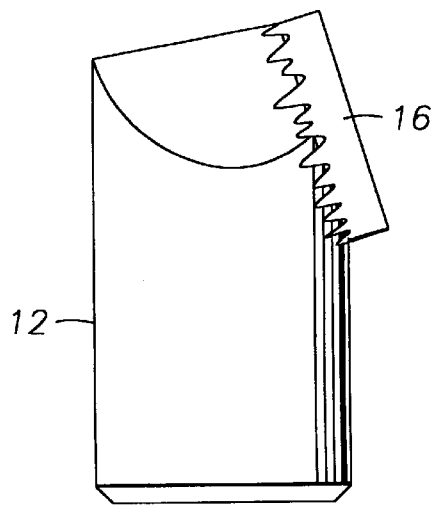
Figure 1D:
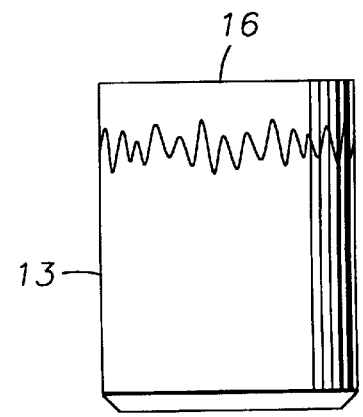

Referring initially to FIG. 1A, a cutting element 10 in accordance with the present invention comprises a stud 12 and a disc-shaped cutting compact 14 bonded thereto. As is known in the art, cutting compact 14 comprises a diamond layer 16 affixed to the surface 17 of supporting substrate 18. The present invention is directed to providing an improved stress distribution between substrate 18 and diamond layer 16, which enhances performance. Alternatively, cutting element could comprise a cylinder 13 with the cutting compact affixed perpendicularly to the axis of the cylinder, as shown in FIG. 1B, or the diamond compact could be affixed directly to the stud, as shown in FIGS. 1C and D. In any event, the present invention is directed to providing an improved bond between the diamond compact and the surface on which it is mounted. Thus, while the invention is described hereinafter in terms of the surface 17 of a supporting substrate 18, it will be understood that it is equally applicable to all of the configurations shown in FIGS. 1A–D, as well as to other applications in which diamond compacts and inserts are used.

Referring now to FIGS. 2A and 2B, one embodiment of the present substrate 20 includes a plurality of undulations 22 extending across the face of the substrate and defining a plurality of ridges 23 and valleys 24. A centerline 26 (shown in phantom) is defined as passing through the center point of each successive ridge face, with the center point being equidistant from the peak and nadir of that face. The height h of a given ridge 23 is defined as the shortest distance from the peak of that ridge to the centerline 26. The depth d of a given valley 24 is defined as the distance from the nadir of that valley to the centerline 26. The amplitude a of a given ridge/valley combination is defined as the height of a given ridge plus the depth of an adjacent valley. The wavelength w of a given ridge/valley combination is defined as the lateral distance from the peak of a given ridge to the peak of an adjacent ridge.

In accordance with the principles of the present invention, the surface of substrate 20 is configured such that at least one of either the amplitude a or the wavelength w is non-constant across the face of substrate 20. More specifically, the amplitude may be increasing while the wavelength is constant or increasing, or the amplitude may be decreasing while the wavelength is constant or increasing. It will be understood that no particular orientation of the substrate surface is specified, as the principles of the present invention describe relative magnitudes. Thus, undulations that appear to be "increasing" as drawn may be described as "decreasing" when viewed from another perspective, and vice versa.

According to the embodiment shown in FIGS. 3A and 3B, the amplitude and wavelength of the undulations are both greatest at the same side of the substrate. In this manner, an asymmetric substrate is formed, having large undulations at one edge, which taper off to much smaller undulations, if any, at the opposite edge. It is believed that the asymmetric compact formed using such an asymmetric substrate will be advantageous, in that it is capable of providing a dual purpose cutting surface in a single insert. Thus, the insert can be oriented to provide the optimal balance of abrasion resistance and impact resistance, depending on the application for which it is to be used.

Alternatively, the present invention also includes substrate surfaces wherein the relationship of adjacent pairs of ridges varies or is irregular, rather than constant. That is, as shown in FIGS. 4A and 4B, the amplitude and wavelength of the undulations 22 can vary simultaneously, independently and without pattern. It will be further understood that the undulations 22 described above can be oriented so as to lie either across the cutting path or parallel to it without departing from the spirit of the present invention. Likewise, the average amplitude of the undulations can be largest in one portion of the substrate surface, while the average wavelength of the undulations is largest in another portion of the substrate surface. In addition, while the undulations shown in FIGS. 4A and 4B are substantially straight, it will be understood that the principles of the present invention could be carried out using crooked or wavy undulations.

Still another alternative embodiment of the present invention is shown in FIGS. 5A and 5B, wherein a single ridge 52 and valley 54 define a spiral 53 in which the amplitude of ridge 52 and 52 valley 54 is greatest at the perimeter of the substrate and decreases as the radius of the ridge decreases. Alternatively, as shown in FIGS. 6A and 6B, the amplitude of ridge 62 and valley 64 can be smallest adjacent the perimeter of the substrate and increase toward the center.

Still another embodiment of the present invention, shown in FIGS. 7A and 7B, encompasses a substrate 70 having a contoured surface 71 that includes a plurality of variously sized projections 72 and indentations 74. These serve the same purpose as undulations 22 and valleys 24, namely a reduction in stress concentration and corresponding increase in the ability of the diamond layer to remain affixed to the substrate. It is preferred that projections 72 and indentations 74 vary in height and diameter, including either regular or irregular variations in at least one of these parameters.

Figure 8:
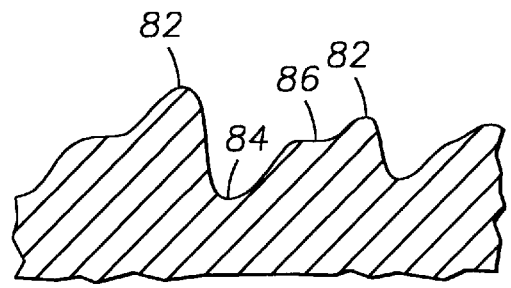
FIGS. 8, 9 and 10 are cross-sectional views of alternative embodiments of the surface devices of the present invention.
Figure 9:
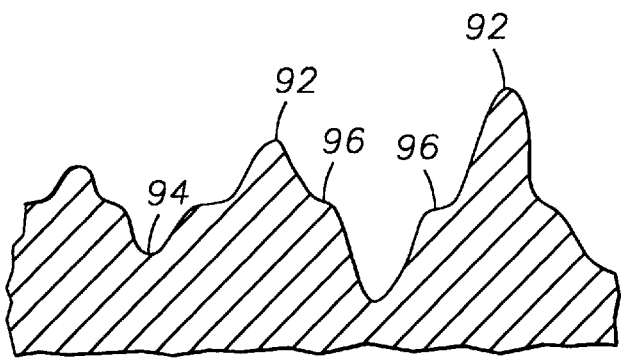

In the embodiments described above, undulations 22 are depicted as generally sinusoidal. The principles of the present invention can also be applied to substrate configurations wherein the surface projections have other shapes. Some alternative shapes are shown in FIGS. 8 and 9, although the alternative shapes depicted therein are not intended to be an exhaustive list of possible alternatives. FIG. 8 shows a pair of ridges 82 and an intervening valley 84, in which the ridges 82 and the valley 84 each include a single inflection or shoulder 86. As used herein, the term shoulder means an inflection at which the absolute value of the slope of the line defining the face decreases and then increases again. FIG. 9 shows a pair of ridges 92 and an intervening valley 94, in which the ridges 92 and the valley 94 each include a pair of inflections or shoulders 96. The waveforms shown in FIGS. 8 and 9, as well as variations thereof, can behave either constant or varying amplitudes and/or frequencies.

Figure 10:
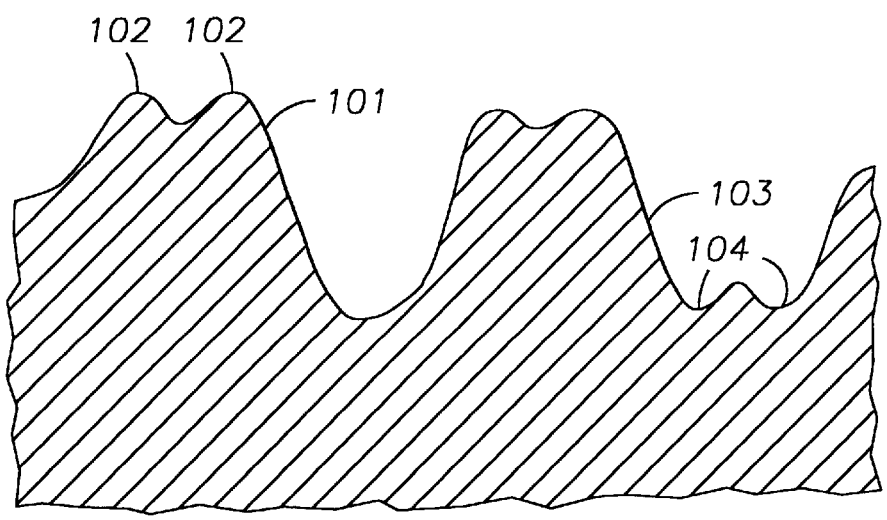

As shown in FIG. 10, each ridge 101 may include more than one maximum 102 and each valley 103 may include more than one minimum 104. For ease of reference hereinafter, maxima 103 and minima 104 are referred to as points of zero slope. In addition, the foregoing waveforms can be combined or superimposed in a variety of ways.

In still another embodiment, the surface of the substrate may include some combination of the foregoing devices. By way of example only, FIGS. 11A and 11B show a surface comprising a ring 110 surrounding a plurality of undulations 122. It will be understood that the reverse is also applicable, in that the surface can include one or more undulations surrounding one or more rings or other devices. It will further be understood that undulations 122, and any other surface device described herein, need not be straight or linear, but may be curvilinear or wavy, or have any other desired configuration.

Likewise, as shown in FIGS. 12A and 12B, either the substrate itself or the centerline of the features can define a convex or concave shape. If the substrate surface is convex (domed), the diamond layer may be thickest around the perimeter of the compact, while if the substrate surface is concave (bowl-shaped), the diamond layer will be thickest at the center of the compact. It will be understood that neither the concave nor the convex embodiment need be symmetrical, i.e. the center of the dome or hollow can be elsewhere than at the center of the substrate surface.

In still another embodiment, shown in FIGS. 13A and 13B, the surface can be divided into a plurality of sectors 130, 132 in which the average amplitude of the surface features decreases in opposite directions. Alternatively or in addition, the frequency and/or amplitude of the features can vary from sector to sector. Furthermore, features that are shown decreasing could increase and features shown to be increasing could decrease in the same manner.

Figure 14A:
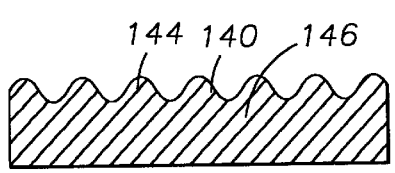
FIGS. 14A and 14B are cross-sectional and perspective views, respectively, of a tenth embodiment of the present substrate layer.
Figure 14B:
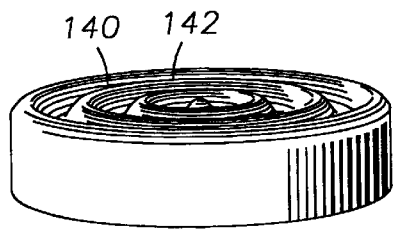

Referring now to FIGS. 14A and 14B, another embodiment of the present invention has one or more surface features 140 that each describe a closed loop 142 on the surface. The closed loops 142 can be nested and generally circular, as shown, or not. As best shown in FIG. 14A, surface features 140 comprise undulations that comprise both ridges 144 and valleys 146, to which any of the variations described above apply, including, but not limited to, variations in amplitude, variations in wavelength, and the addition of shoulders.

Figure 15A:
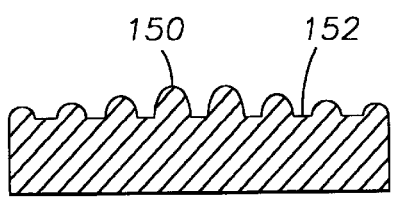
FIGS. 15A and 15B are cross-sectional and perspective views, respectively, of a eleventh embodiment of the present substrate layer.
Figure 15B:
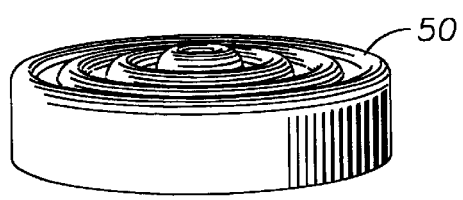
Figure 16A:
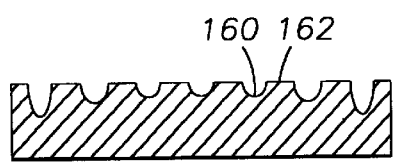
FIGS. 16A and 16B are cross-sectional and perspective views, respectively, of a twelfth embodiment of the present substrate layer.
Figure 16B:
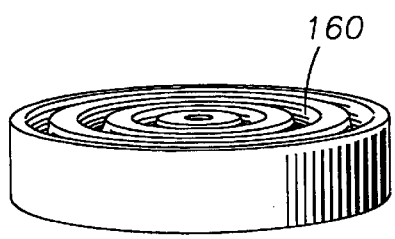
Figure 17A:
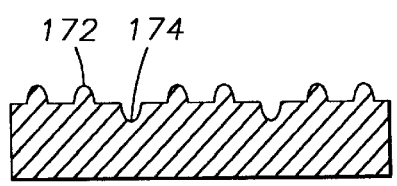
FIGS. 17A and 17B are cross-sectional and perspective views, respectively, of a thirteenth embodiment of the present substrate layer.
Figure 17B:
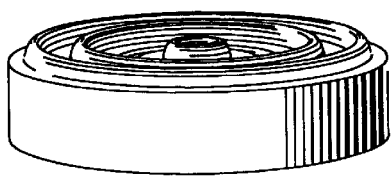
Figure 18:
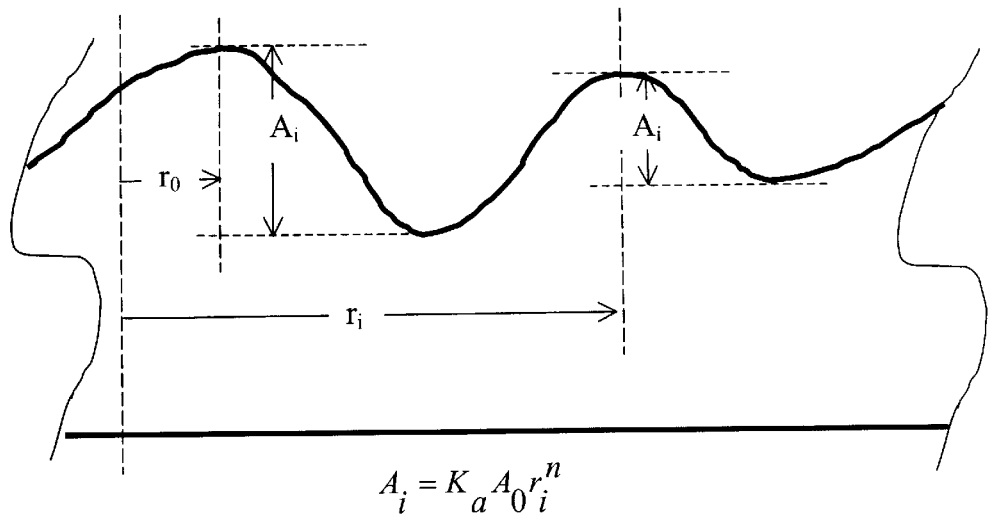
FIG. 18 is a cross-sectional view of a fourteenth embodiment of the present substrate layer.
Figure 19:
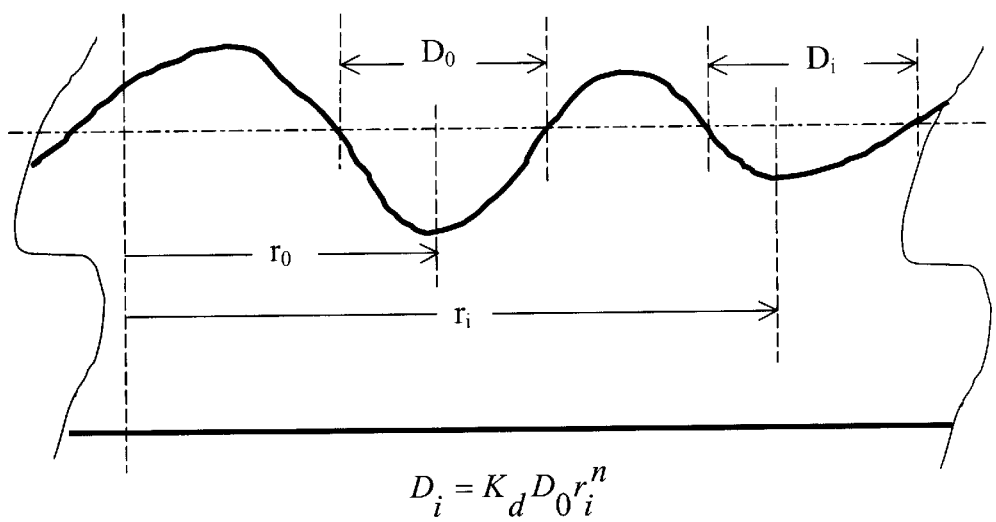
FIG. 19 is a cross-sectional view of a fifteenth embodiment of the present substrate layer.

In the alternative, the surface may include either ridges or valleys. These embodiments, shown in FIGS. 15A–B and 16A–B, are referred to hereinafter as "ridged" and "grooved" surfaces respectively. In each case, approximately one-half of the waveform is eliminated, leaving only ridges 150 extending into the diamond layer (FIGS. 15A and 15B) or grooves 160 extending into the substrate layer (FIGS. 16A and 16B). Between the ridges or grooves are relatively flat intervening areas 152, 162. By "relatively flat" it is meant that the amplitude of any surface modulation in intervening areas 152, 162 is significantly less than the amplitude of ridges 150 or grooves 160. For example, intervening areas 152 and 162 can be slightly convex, flat, slightly concave or wavy. As discussed above with respect to earlier embodiments, the amplitude of ridges 150 and grooves 160 can vary randomly across the surface, increase generally toward the center of the surface (as shown in FIGS. 15A and 15B), or decrease generally toward the center of the surface (as shown in FIGS. 16A and 16B). Likewise ridges 172 and grooves 174 can both be used on a single substrate, as shown in FIGS. 17A and 17B.

According to another embodiment, the substrate/diamond interface described above includes protuberances whose amplitudes and position relative to the center of the interface, or displacement, are governed by defined mathematical relationships. These mathematical relationships can apply over the entire substrate interface or over a portion of the interface defined within a restricted region. For example, the amplitudes of the protuberances can be governed by defined mathematical relationships so that they vary consistently and predictably. An example of an equation that can be used to define the amplitudes of the protuberances is $$A_i = K_a r_i^n A_0$$

where $A_0$ is the amplitude at the commencement of the pattern, $A_i$ is the amplitude at a distance $r_i$ from the position of $A_0$, n is a real number, and $K_a$ is a relational constant for the amplitude function. In this equation, the position of $A_0$ corresponds to $r_0$.

Alternatively, the displacement of each protuberance or feature can be governed by defined mathematical relationships such that:

$$D_i = K_d r_i^m D_0$$

where $D_0$ is the displacement at the commencement of the pattern, $D_i$ is the displacement at a distance $r_i$ from the position of $D_0$, m is a real number, and $K_d$ is a relational constant for the displacement function. In this equation, the position of $D_0$ corresponds to $r_0$.

If the foregoing mathematical equations are applied over less than all of the surface of the interface, the balance of the surface can be planar or irregular. The portion of the surface that is defined by the foregoing equations is preferably dependent on the type of protuberance and mathematical relationships describing the amplitude and or displacement. In addition, the surface features described above with respect to FIGS. 2–17B can be configured so as to be defined by either or both of the foregoing mathematical expressions relating to amplitude and displacement.

Likewise, the undulations or protuberances on a first portion of the surface can have consistently varying amplitudes that vary according to a different from consistently varying amplitudes on another portion of the surface, with each set of varying amplitudes being governed by a separate mathematical equation of the form given above. For example, in one embodiment, $A_{1,i}=r_i^{n1}K_{1,i}A_{1,0}$ and $A_{2,1}=r_i^{n2}K_{2,i}A_{2,0}$. Similarly, portion of said surface which can also be defined by mathematical equations of the form $D_{1,i}=r^{m1}K_{1,i}D_{01}$ and $D_{2,i}=r^{m2}K_{2,i}D_{2,0}$.

While various preferred embodiments of the invention have been shown and described, modifications thereof can be made by one skilled in the art without departing from the spirit and teachings of the invention. For example, the insert and/or substrate need not be round, but may be ovoid, truncated, or any of several other known cutter shapes.

What is claimed is:

1. A compact for use on a cutting element for an earth boring bit, comprising:
    a cemented carbide substrate having a supporting surface; and
    a superhard layer bonded to said supporting surface, thereby forming a superhard/substrate interface including a plurality of protuberances having amplitudes and displacements that vary and are governed by defined mathematical relationships, each said mathematical relationship comprising a function of radius from a predetermined point, said protuberances comprising ridges and valleys.

2. The compact according to claim 1 wherein said superhard layer is selected from the group consisting of diamond, PCBN and materials having hardness of at least 2,700 Knoop.

3. A compact for use on a cutting element for an earth boring bit, comprising:
    a cemented carbide substrate having a supporting surface; and
    a superhard layer bonded to said supporting surface, thereby forming a superhard/substrate interface including a plurality of protuberances having amplitudes and displacements that vary and are governed by defined mathematical relationships, said protuberances comprising ridges and valleys;
    wherein said interface comprises features having varying amplitudes, said amplitudes varying consistently according to defined mathematical relationships of the form $A_i=K_a r_i^n A_0$, where $A_0$ is the amplitude at the commencement of the pattern, $A_i$ is the amplitude at a distance $r_i$ from the position of $A_0$, n is a real number, and $K_a$ is a relational constant for the amplitude function.

4. A compact for use on a cutting element for an earth boring bit, comprising:
    a cemented carbide substrate having a supporting surface; and
    a superhard layer bonded to said supporting surface, thereby forming a superhard/substrate interface including a plurality of protuberances having amplitudes and displacements that are governed by defined mathematical relationships;
    said interface comprising features having varying displacements, said displacements varying consistently according to defined mathematical relationships of the form $D_i=K_d r_i^m D_0$ where $D_0$ is the displacement at the commencement of the pattern, $D_i$ is the displacement at a distance $r_i$ from the position of $D_0$, m is a real number, and $K_d$ is a relational constant for the displacement function.

5. A compact for use on a cutting element for an earth boring bit, comprising:
    a cemented carbide substrate having a supporting surface; and
    a superhard layer bonded to said supporting surface, thereby forming a superhard/substrate interface including a plurality of protuberances having amplitudes and displacements that are governed by defined mathematical relationships;
    said interface comprising features having varying amplitudes and displacements, said amplitudes varying consistently according to defined mathematical relationships of the form $A_i=K_a r_i^n A_0$, where $A_0$ is the amplitude at the commencement of the pattern, $A_i$ is the amplitude at a distance $r_i$ from the position of $A_0$, n is a real number, and $K_a$ is a relational constant for the amplitude function and said displacements varying consistently according to defined mathematical relationships of the form $D_i=K_d r_i^m D_0$ where $D_0$ is the displacement at the commencement of the pattern, $D_i$ is the displacement at a distance $r_i$ from the position of $D_0$, m is a real number, and $K_d$ is a relational constant for the displacement function.

6. The compact according to claim 5 wherein said features include at least two nonintersecting ridges.

7. The compact according to claim 6 wherein said nonintersecting ridges are substantially straight.

8. The compact according to claim 6 wherein said nonintersecting ridges are not straight.

9. The compact according to claim 6 wherein said nonintersecting ridges are wavy.

10. The compact according to claim 5 wherein said interface is substantially planar over a portion of its area.

11. The compact according to claim 10 wherein said planar portion of its area comprises at least 20%.

12. A compact for use on a cutting element for an earth boring bit, comprising:
    a substrate having a supporting surface;
    a superhard layer bonded to said supporting surface, thereby forming a superhard/substrate interface, said interface being irregular and comprising surface features having varying amplitudes and frequencies, said features include at least two nonintersecting ridges;
    wherein said interface further includes at least one ridge that is arcuate when viewed in plan view.

13. The compact according to claim 12 wherein said arcuate ridge is circular.

14. A compact for use on a cutting element for an earth boring bit, comprising:
    a substrate having a supporting surface; and
    an abrasive layer bonded to said supporting surface, thereby forming an abrasive/substrate interface;
    wherein said abrasive/substrate interface includes a spiral shaped ridge, each portion of said ridge projecting from a common defining surface, said ridge being continuous.

15. The compact according to claim 14 wherein said ridge increases in amplitude toward the center of the supporting surface.

16. The compact according to claim 14 wherein said ridge decreases in amplitude toward the center of the supporting surface.

17. The cutting element according to claim 16 wherein the amplitude of the ridges and valleys can be defined by a mathematical equation.

18. A compact for use on a cutting element for an earth boring bit, comprising:

a substrate having a supporting surface; and an abrasive layer bonded to said supporting surface, thereby forming an abrasive/substrate interface, said interface including a spiral shaped ridge, said ridge decreasing in amplitude toward the center of the supporting surface.

19. A cutting element for an earth boring bit, comprising:

a stud having first and second ends, said first end being adapted for attachment to a the bit;

a substrate having first and second substantially opposed surfaces, said first surface affixed to said second stud end; and an abrasive cutting layer affixed to said second substrate surface;

wherein said second substrate surface includes a plurality of protuberances having amplitudes and displacements that are governed by defined mathematical relationships, said protuberances comprising ridges and valleys.

20. The compact according to claim 19 wherein said interface is substantially planar over a portion of its area.

21. The cutting element according to claim 19 wherein said second surface has at least one plane of symmetry.

22. The cutting element according to claim 19 wherein said protuberances are curvilinear.

23. The cutting element according to claim 19 wherein said protuberances have an average displacement on a first portion of said supporting surface that is greater than the average displacement on another portion of said surface.

24. The cutting element according to claim 19 wherein said protuberances have an average amplitude on a first portion of said supporting surface that is greater than the average amplitude on another portion of said surface.

25. A cutting element for an earth boring bit, comprising:

a substrate having a supporting surface; and an abrasive layer bonded to said supporting surface, thereby forming an abrasive/substrate interface;

wherein said abrasive/substrate interface includes a plurality of ridges and valleys wherein at least one of said ridges includes at least two faces and at least one shoulder and the height of said ridges is governed by a mathematical relationship.

26. The cutting element according to claim 25 wherein each ridge includes two shoulders.

27. The cutting element according to claim 26 wherein said shoulders are on the same face.

28. The cutting element according to claim 25 wherein said shoulders are on opposite faces of each ridge.

29. The cutting element according to claim 25 wherein said ridges are non-sinusoidal.

30. A cutting element for an earth boring bit, comprising:

a substrate having a supporting surface; and an abrasive layer bonded to said supporting surface, thereby forming an abrasive/substrate interface;

wherein said abrasive/substrate interface includes a plurality of ridges and valleys wherein at least one of said ridges includes at least two faces and at least one shoulder and wherein the spacing between adjacent ridges varies consistently and can be defined by a mathematical expression.

31. A cutting element for an earth boring bit, comprising:

a substrate having a supporting surface; and an abrasive layer bonded to said supporting surface, thereby forming an abrasive/substrate interface;

wherein said abrasive/substrate interface includes a plurality of ridges and valleys wherein at least one of said ridges includes at least two faces and at least one shoulder and wherein the height of said ridges varies consistently and can be defined by a mathematical expression.

32. A cutting element for an earth boring bit, comprising:

a substrate having a supporting surface; and a superhard layer bonded to said supporting surface, thereby forming a superhard/substrate interface;

wherein said interface includes a plurality of ridges and valleys wherein at least one of said ridges and said valleys includes at least two points of zero slope; and wherein the amplitudes of said ridges and the amplitudes of said valleys are each governed by a single mathematical equation of the form $A_i = K_a r_i^n A_0$, where $A_0$ is the amplitude at the commencement of the pattern, $A_i$ is the amplitude at a distance $r_i$ from the position of $A_0$, n is a real number, and $K_a$ is a relational constant for the amplitude function and the wherein the displacements of said ridges and the displacements of said valleys are each governed by a single mathematical relationships of the form $D_i = K_d r_i^m D_0$ where $D_0$ is the displacement at the commencement of the pattern, $D_i$ is the displacement at a distance $r_i$ from the position of $D_0$, m is a real number, and $K_d$ is a relational constant for the displacement function.

33. The cutting element according to claim 32 wherein the displacements of the ridges and valleys can be defined by a mathematical equation.

34. The cutting element according to claim 32 wherein the amplitude of the points of zero slope can be defined by a mathematical equation.

35. The cutting element according to claim 32 wherein the displacements of the point of zero slope can be defined by a mathematical equation.

36. The cutting element according to claim 32 wherein the positions of the point of zero slope can be defined by a mathematical equation.

* * * * *